US012573927B2

(12) United States Patent 　　　　　(10) Patent No.: 　US 12,573,927 B2
Chowdhury et al. 　　　　　　　　　　(45) Date of Patent: 　　Mar. 10, 2026

(54) HYBRID ROTOR FOR SYNCHRONOUS MACHINE

(71) Applicant: GM GLOBAL TECHNOLOGY OPERATIONS LLC, Detroit, MI (US)

(72) Inventors: Mazharul Chowdhury, Canton, MI (US); William R. Jensen, Walled Lake, MI (US); Le Chang, Shelby Township, MI (US); Mohammad F. Momen, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 282 days.

(21) Appl. No.: 18/483,569

(22) Filed: Oct. 10, 2023

(65) Prior Publication Data

US 2025/0119043 A1 　　Apr. 10, 2025

(51) Int. Cl.
　　*H02K 29/03* 　　　(2006.01)
　　*H02K 1/276* 　　　(2022.01)
(52) U.S. Cl.
　　CPC ........... *H02K 29/03* (2013.01); *H02K 1/2766* (2013.01)
(58) Field of Classification Search
　　CPC ...... H02K 1/2766; H02K 1/246; H02K 29/03; H02K 23/42; H02K 1/27
　　See application file for complete search history.

(56) References Cited

U.S. PATENT DOCUMENTS

| | | | |
|---|---|---|---|
| 2002/0175583 A1* | 11/2002 | Kikuchi | H02K 16/02 |
| | | | 310/156.56 |
| 2002/0175584 A1* | 11/2002 | Koharagi | H02K 1/2766 |
| | | | 310/156.56 |

| | | | |
|---|---|---|---|
| 2002/0175585 A1* | 11/2002 | Tagome | H02K 1/223 |
| | | | 310/156.56 |
| 2003/0042814 A1* | 3/2003 | Tagome | H02K 1/276 |
| | | | 310/156.08 |
| 2003/0090167 A1* | 5/2003 | Kajiura | H02K 1/246 |
| | | | 903/910 |

(Continued)

FOREIGN PATENT DOCUMENTS

| | | |
|---|---|---|
| CN | 213484729 U | 6/2021 |
| DE | 60130600 T2 | 2/2008 |

(Continued)

OTHER PUBLICATIONS

KR-20180079796-A Machine Translation (Year: 2018).*

*Primary Examiner* — Oluseye Iwarere
*Assistant Examiner* — Masoud Vaziri
(74) *Attorney, Agent, or Firm* — Quinn IP Law

(57) 　　　　　ABSTRACT

Synchronous electric machines including a stator having a plurality of conductive windings configured for carrying alternating currents for generating a rotating magnetic field (RMF), and a hybrid rotor configured for rotating within the stator according to a torque induced by the RMF. The hybrid rotor includes a plurality of laminations stacked together axially. The laminations include a non-permanent magnet subset of the laminations having one or more through-holes configured for limiting torque ripples. The laminations include a permanent magnet subset of the laminations having one or more pockets, with the pockets each removably holding one or more permanent magnets. The permanent magnets are operable for interacting magnetically with the RMF.

20 Claims, 5 Drawing Sheets

(56) References Cited

U.S. PATENT DOCUMENTS

2014/0021820 A1\* 1/2014 Kondou ................. H02K 1/276
310/156.53
2022/0109339 A1\* 4/2022 Chowdhury ......... H02K 1/2766

FOREIGN PATENT DOCUMENTS

EP       1253701 A2   10/2002
EP       2991207 A1    3/2016
JP     2004129448 A    4/2004
KR   20180079796 A  \*  7/2018   ............ H02K 1/276

\* cited by examiner

HYBRID ROTOR FOR SYNCHRONOUS MACHINE

INTRODUCTION

The present disclosure relates generally to electric machines, and more particularly, relates to a hybrid rotor for a synchronous electric machine.

Some synchronous electric machines include a rotor configured for rotating within a stator. A common implementation of those types of synchronous electric machines includes the rotor having permanent magnets operable for rotating in response to a magnetic field from the stator. Such implementation is widely used and is generally believed to be adequate. However, rotors having permanent magnets may be relatively susceptible to torque ripples, particularly those stemming from oscillations in the electric current used in connection with magnetic field from the stator. The rotor having permanent magnets also may be relatively susceptible to excess heat affecting the thermal performance of the rotor. This reliance on permanent magnets may influence the overall performance of the synchronous electric machine.

SUMMARY

One aspect of the present disclosure relates to a synchronous electric machine having a hybrid rotor. The hybrid rotor may include a plurality of lamination having permanent magnet subsets and non-permanent subsets for minimizing or reducing torque ripples. The plurality of lamination may be configured for optimizing thermal performance of the rotor.

A synchronous electric machine is provided. The synchronous electric machine includes a stator and a hybrid rotor. The stator includes a plurality of conductive windings configured for carrying alternating currents for generating a rotating magnetic field (RMF). The hybrid rotor is configured for rotating within the stator according to a torque induced by the RMF, the hybrid rotor having a plurality of laminations stacked together axially. A non-permanent magnet subset of the laminations includes one or more through-holes configured for limiting torque ripple. A permanent magnet subset of the laminations includes one or more pockets, with the pockets each removably holding one or more permanent magnets. The permanent magnets are operable for interacting magnetically with the RMF.

In some embodiments, the hybrid rotor includes a first non-permanent magnet lamination of the non-permanent magnet subset at a first distal end and a second non-permanent magnet lamination of the non-permanent magnet subset at a second distal end axially opposite of the first distal end.

In some embodiments, each lamination of the permanent magnet subset is disposed between the first distal end and the second distal end.

In some embodiments, a first permanent magnet lamination of the permanent magnet subset adjoins the first non-permanent magnet lamination and a second permanent magnet lamination of the permanent magnet subset adjoins the second non-permanent magnet.

In some embodiments, a third non-permanent magnet lamination of the non-permanent magnet subset is disposed between the first and second permanent magnet laminations.

In some embodiments, the hybrid rotor includes a first permanent magnet lamination of the permanent magnet subset at a first distal end and a second permanent magnet lamination of the permanent magnet subset at a second distal end axially opposite of the first distal end.

In some embodiments, each lamination of the non-permanent magnet subset is disposed between the first distal end and the second distal end.

In some embodiments, an air gap separates the hybrid rotor from the stator and varies axially along a length of the hybrid rotor, and wherein the air gap is defined as a space between the hybrid rotor and the stator.

In some embodiments, the first portion coincides with the non-permanent magnet subset and the second portion coincides with the permanent magnet subset.

In some embodiments, the first portion coincides with the non-permanent magnet subset and the second portion coincides with the permanent magnet subset.

In some embodiments, the second portion is disposed axially between a pair of first portions.

In some embodiments, the permanent magnets are removably held in each of the pockets.

In some embodiments, the permanent magnets include a magnetic material having a self-generating persistent magnetic field.

In some embodiments, the non-permanent magnet subset is devoid of the magnetic material.

In some embodiments, the non-permanent magnet subset includes steel, soft magnetic composites, or a combination thereof.

According to an alternative embodiment, synchronous electric machine includes a stator and a hybrid rotor. The stator includes a plurality of conductive windings configured for carrying alternating currents for generating a rotating magnetic field (RMF). The hybrid rotor is configured for rotating relative to the stator, the hybrid rotor including a plurality of laminations. A permanent magnet subset of the laminations includes one or more pockets holding a permanent magnet. Each permanent magnet includes a permanent magnetic material having a self-generating persistent magnetic field. A non-permanent magnet subset of the laminations is devoid of the permanent magnetic material.

In some embodiments, the permanent magnet is operable for interacting magnetically with the RMF to generate a magnetic torque in the hybrid rotor.

In some embodiments, the non-permanent magnet subset is operable for interacting with the RMF to generate a reluctance torque in the hybrid rotor.

According to an alternative embodiment, a motor vehicle is provided. The motor vehicle includes a vehicle body, multiple drive wheels mounted to the vehicle body, and a synchronous electric machine mounted to the vehicle body. The synchronous electric machine is operable to drive one or more of the drive wheels to thereby propel the motor vehicle. The synchronous electric machine includes a stator and a hybrid rotor. The stator includes a plurality of conductive windings configured for carrying alternating currents for generating a rotating magnetic field (RMF). The hybrid rotor is configured for rotating within the stator according to a torque induced by the RMF. The hybrid rotor includes a plurality of laminations stacked together axially. A non-permanent magnet subset of the laminations includes one or more through-holes configured for limiting torque ripple. A permanent magnet subset of the laminations includes one or more pockets, with the pockets each removably holding one or more permanent magnets, the permanent magnets operable for interacting magnetically with the RMF.

These features and advantages, along with other features and advantages of the present teachings, may be readily apparent from the following detailed description of the modes for carrying out the present teachings when taken in connection with the accompanying drawings. It should be understood that even though the following figures and embodiments may be separately described, single features thereof may be combined to additional embodiments.

BRIEF DESCRIPTION OF THE DRAWINGS

The accompanying drawings, which may be incorporated into and constitute a part of this specification, illustrate implementations of the disclosure and together with the description, serve to explain the principles of the disclosure.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
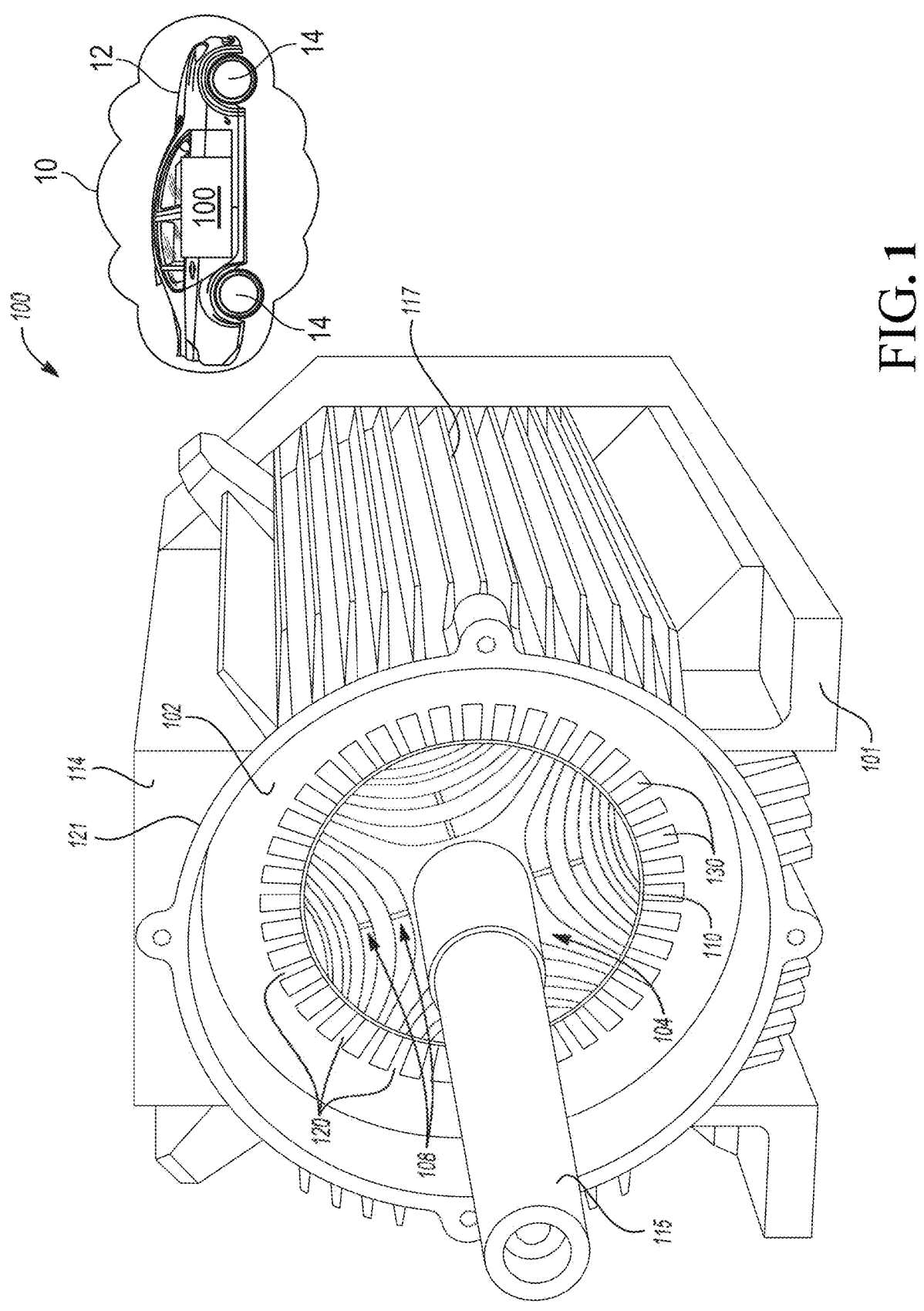
FIG. 1 is a perspective view of an exemplary synchronous electric machine having a stator and a hybrid rotor within the stator, in accordance with one or more implementations of the disclosure.

FIG. 1 is a perspective view of an exemplary synchronous electric machine 100 having a stator 102 and a hybrid rotor 104 within the stator 102, in accordance with one or more implementations of the disclosure. The electric machine 100 includes a stator 102 having a plurality of conductive windings configured for carrying alternating current for generating a rotating magnetic field (RMF).

The electric machine 100 may include a base 101 coupled to a housing 114 of the electric machine 100. The housing 114 may include the controller for controlling the input alternating current (AC) and monitoring parameters, etc. The housing 114 may be coupled to sets of fins 117 for dissipating heat generated by the electric machine 100.

A number of protrusions 120 are arranged around an inner periphery of the stator 102. The size, shape, number and overall geometry of these protrusions may vary depending on the design. The protrusions collectively define stator slots 130 between adjacent protrusions. The stator slots 130 are indentations in the stator inset into the inner periphery. The spacing and number of slots are relevant to defining various characteristics of the electric machine 100, such as number of poles, number of phases, and number of harmonics.

Referring still to FIG. 1, the stator slots 130 arranged around the inner portion of the stator 102 open to an air gap 110 which separates the stator 102 and hybrid rotor 104. For simplicity, although the stator slots 130 in the stator 102 and various openings in the hybrid rotor 104 lead directly to the air gap 110, FIG. 1 defines the air gap 110 using two circles that extend around the inner periphery of the stator 102 and outer portion of the hybrid rotor 104. The hybrid rotor 104 in this configuration has a cylindrical outline, although this geometry may vary widely and other rotors may employ different geometries, e.g., using a different number and geometry of salient poles distributed around the hybrid rotor 104, or otherwise. A circular housing 121 is disposed across an outer periphery of the stator 102.

While not shown to avoid unduly obscuring concepts of the disclosure, the stator 102 includes a plurality of conductive windings configured for carrying alternating current for generating a rotation magnetic field (RMF). The plurality of conductive windings is wound around the protrusions. In this configuration, by virtue of the traversal of the winding along the slots and thus along a longitudinal direction of the rotor, the alternating current may generate an RMF that extends (or out of) a radial component of the hybrid rotor 104. Depending on the geometry of the protrusions 120 and stator slots 130 on the stator as well as the physical configuration of the hybrid rotor 104, the position and total number of windings may vary without departing from the spirit and scope of the present disclosure.

Figure 2:
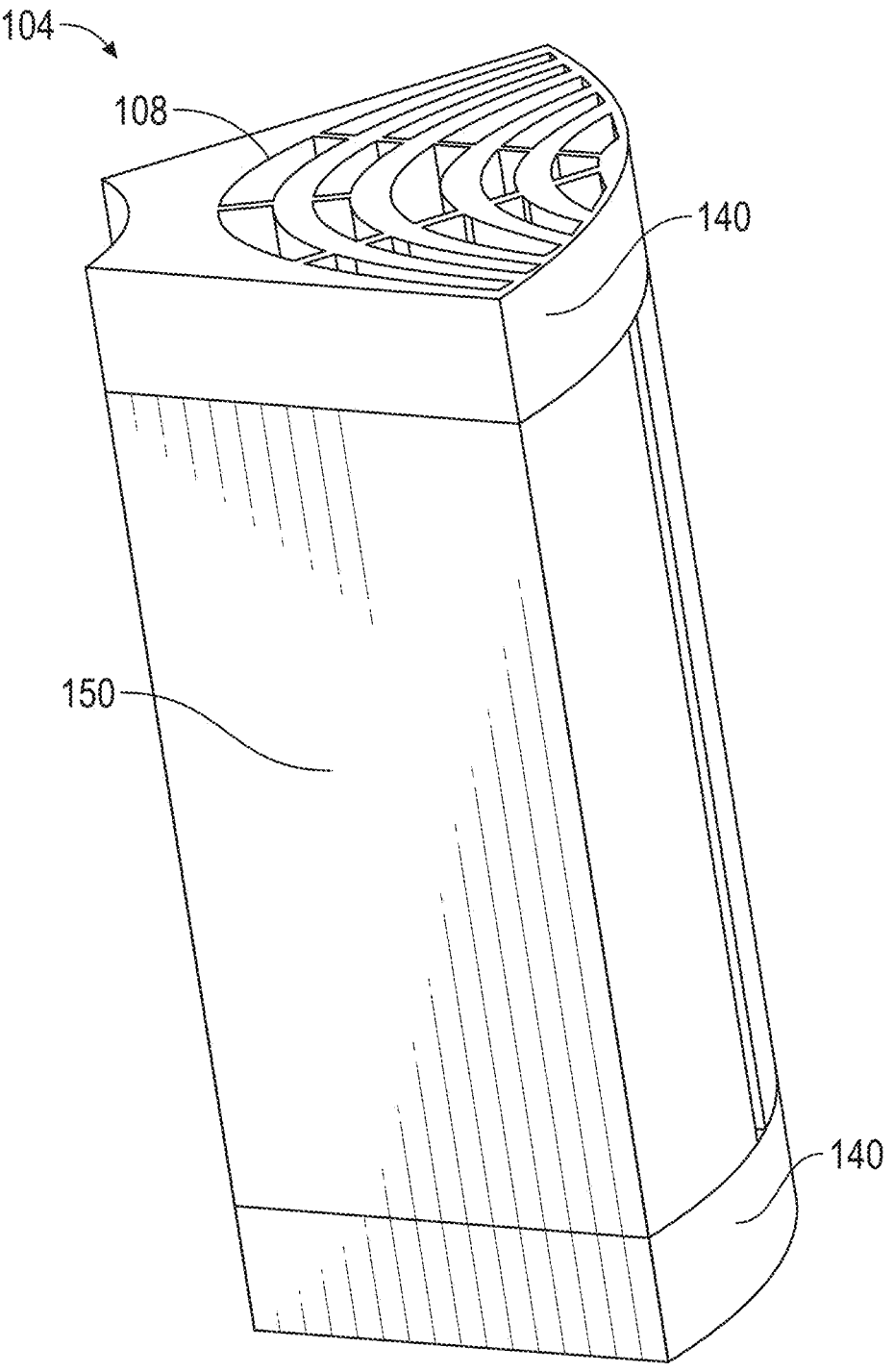
FIG. 2 is a perspective view of a portion of the hybrid rotor in an exemplary configuration, in accordance with one or more implementations of the disclosure.

The hybrid rotor 104 is configured for rotating within the stator 102 according to a torque induced by the RMF. The hybrid rotor 104 includes a plurality of laminations stacked together axially and has an axially variable reluctance profile because of differing laminations in the plurality of laminations. The plurality of laminations includes a non-permanent magnet subset 140 and a permanent magnet subset 150 as shown in FIG. 2. The non-permanent magnet subset includes one or more through-holes 108.

The electric machine 100 of FIG. 1 also shows a shaft 115. Depending on the application, the shaft 115 may rotate with the hybrid rotor 104 at different loads to do work. In an electrical vehicle (EV), for example, the turning shaft may be used to rotate one or more of the wheels.

Additional aspects of this disclosure are directed to the electric machine 100 being operably disposed, incorporated, or otherwise used in a vehicle, for example, a motor vehicle. As used herein a "vehicle" is understood to mean a device configured for transporting people, things, objects, or the like. Non-limiting examples of motor vehicles (e.g., internal combustion engine (ICE) vehicles, electric vehicles including electric battery and fuel cell vehicle or the like) include land vehicles (e.g., cars, trucks, motorcycles, electric bike, buses, trains or the like), aerial vehicles (e.g., airplanes, helicopters, unmanned aerial vehicles or the like), water vehicles (e.g., boats, watercrafts, or the like) and amphibious vehicles (e.g., hovercrafts or the like).

In an example, an electric vehicle includes a vehicle body, multiple drive wheels mounted to the vehicle body, and synchronous electric machine (i.e., the electric machine 100) mounted to the vehicle body and operable to drive one or more of the drive wheels to thereby propel the electric vehicle.

The electric machine 100 may be used as a motor to convert electrical energy into mechanical energy, as previously discussed regarding propelling the electric vehicle. Alternatively, the electric machine 100 may be used as a generator to convert mechanical energy into electrical energy. Regardless the mode of use, the electric machine 100 operates on the principle of electromagnetic induction, where the motion of a conductor within a magnetic field generates an electrical voltage (as in the case of a motor) and the interaction between magnetic fields and electrical currents generates mechanical motion (as in the case of a generator).

FIG. 2 is a perspective view of a portion of the hybrid rotor 104 in an exemplary configuration, in accordance with one or more implementations of the disclosure. The hybrid rotor 104 includes a plurality of laminations individually stacked axially together in a side-by-side facing relation. For simplicity of the presentation, the individual laminations with identical or similar characteristic are grouped or combined into a non-permanent magnet subset 140 of the laminations and a non-permanent magnet 150 of the laminations. For example, the non-permanent magnet subset 140 may include a plurality of individual laminations devoid of magnetic material, such as a permanent magnet. The permanent magnet subset 150 may include individual laminations having permanent magnets. Subsets may be divided or separated as shown in FIG. 3.

Referring to FIG. 2, the hybrid rotor 104 has an axially varying reluctance profile because of the abilities of the non-permanent magnet subset 140 and the permanent magnet subset 150 to generate reluctance torque during operation of the electric machine 100. A reluctance profile is a graphical representation or description of how the magnetic reluctance within the electric machine 100 varies with the position of the rotor relative to the stator.

The non-permanent magnet subset 140 experiences reluctance torque since the non-permanent magnet subset is devoid of permanent magnets 154 and is made of a material having a high magnetic permeability (i.e., non-permanent magnet material). A non-permanent magnet material is defined as a material having a high magnetic permeability that is devoid of permanent magnets.

Figures 3, 4:
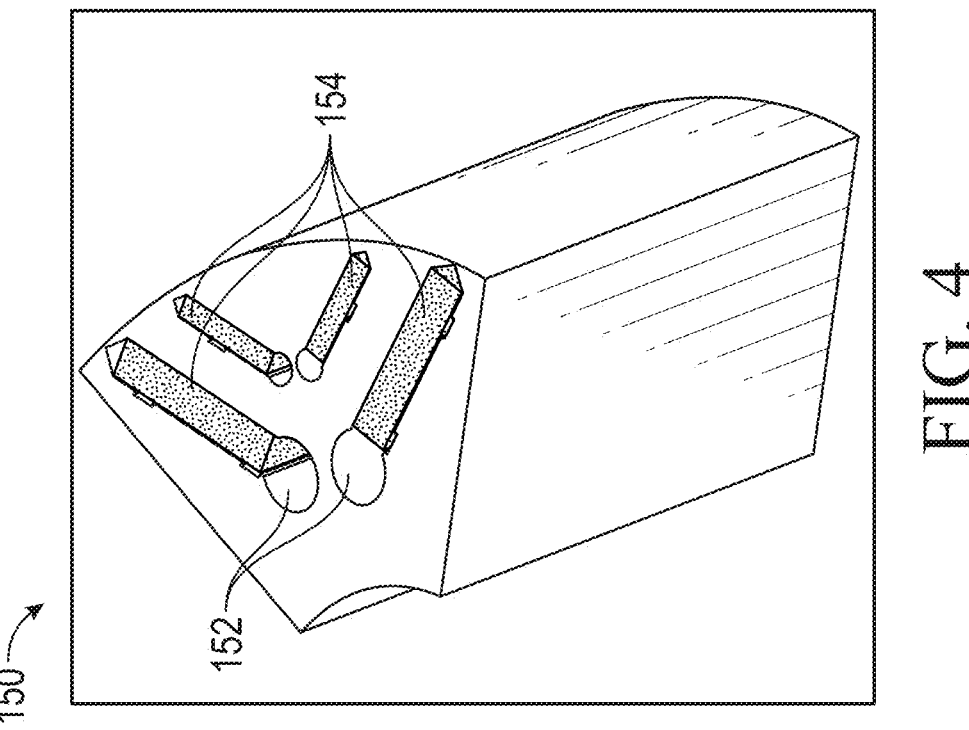
FIG. 3 is a perspective view of a non-permanent magnet subset of the hybrid rotor of FIG. 2, in accordance with one or more implementations of the disclosure.
FIG. 4 is a perspective view of a permanent magnet subset of the hybrid rotor of FIG. 2, in accordance with one or more implementations of the disclosure.

The permanent magnet subset 150 experiences both reluctance torque and magnetic torque since the permanent magnet subset 150 is made of a non-permanent magnet material and includes permanent magnets 154 as shown in FIG. 4. Non-limiting examples of non-permanent magnet materials are steel, steel laminations, soft magnetic composites (SMC), ferromagnetic cores made from silicon steel, and/or the like.

By increasing the reluctance torque using non-permanent magnet subsets 140, the electric machine 100 is able to maintain its overall torque performance while reducing the magnetic torque, ultimately minimizing or reducing torque ripples. The magnetic torque is reduced by decreasing the number of permanent magnets in the laminations with permanent magnets (i.e., permanent magnet subsets 140).

As illustrated in FIG. 2, the permanent magnet subset 150 is disposed between two non-permanent magnet subsets 140 with the permanent magnet subset 150 having an axial length greater than the combined axial lengths of the two non-permanent magnet subsets 140. In one embodiment, the permanent magnet subset 150 may have an axial length of 65 millimeters. Each non-permanent magnet subset 140 may have an axial length of 20 millimeters. In another embodiment, the permanent magnet subset 150 may have an axial length of 70 millimeters. Each non-permanent magnet subset 140 may have an axial length of 10 millimeters.

FIG. 3 is a perspective view of a non-permanent magnet subset 140 of the hybrid rotor 104 of FIG. 2, in accordance with one or more implementations of the disclosure. The non-permanent magnet subset 140 includes one or more through-holes 108 configured for limiting torque ripples. As illustrated in FIG. 3, the through-holes 108 may be shaped as concentric rings extending in a radial direction starting from an edge of the hybrid rotor 104 towards the center of the hybrid rotor. In other embodiments, the through-holes 108 may have different orientations or shapes.

The one or more through-holes 108 may be constructed to create flux barriers, which are regions of air within the hybrid rotor. A primary purpose of the flux barriers is to create a difference between high and low reluctance (i.e., magnetic reluctance) within the non-permanent subset 140 to enable the hybrid rotor 104 to rotate due to reluctance torque.

The non-permanent magnet subset 140 may limit torque ripple by optimizing the magnetic circuit with a low-reluctance path for the magnetic flux in the electric machine 100 or by enhancing synchronization by minimizing variations in the magnetic field. Torque ripple, also known as torque pulsation or torque variation, refers to the fluctuation or variation of the output torque of an electric machine 100 during its operation.

FIG. 4 is a perspective view of a non-permanent magnet subset 140 of the hybrid rotor 104 of FIG. 2, in accordance with one or more implementations of the disclosure. The permanent magnet subset 150 includes one or more pockets 152, with the pockets 152 each removably holding one or more permanent magnets 154. The permanent magnets 154 are operable for interacting magnetically with the RMF and for enabling the hybrid rotor 104 to rotate due to magnetic torque.

The permanent magnets 154 include a magnetic material (i.e., permanent magnetic material) having a self-generating persistent magnetic field. Non-limiting examples of permanent magnets 154 include neodymium iron boron (NdFeB) magnets, samarium cobalt (SmCo) magnets, alnico (aluminum-nickel-cobalt) magnets, ferrite (ceramic) magnets, rare-earth magnet alloys (e.g., DyFe, dysprosium iron; TbFe, terbium iron), and/or the like.

In addition to magnetic torque, the permanent magnet subset 150 may experience reluctance torque since the permanent magnets 154 are placed in the interior of the permanent magnet subset 150. By placing the permanent magnets 154 within the permanent magnet subset 150, the interior of the permanent magnet subset 150 has a varying reluctance in the radial direction because the permanent magnets 154 have a different magnetic permeability than the material of the non-permanent magnet subset 140. The varying reluctance of the permanent magnet subset 150 is like the reluctance of permanent magnets 154 for interior permanent magnet motors (IPM).

In another embodiment, the permanent magnets 154 may be affixed to the exterior surface of the permanent magnet subset 150. Like surface permanent magnet motors (SPM), the reluctance torque may be small, or negligible, as compared to the magnetic torque generated from the permanent magnets 154.

Figure 5:
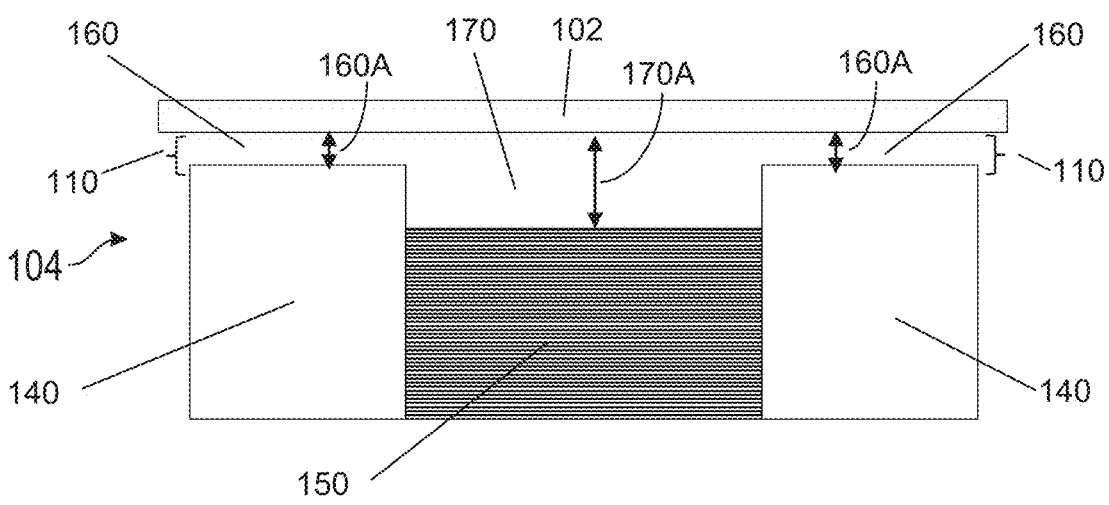
FIGS. 5-6 are schematic views of a cross-sectional view of a portion of a stator and a hybrid rotor of an exemplary synchronous electric machine having an air gap between the stator and hybrid rotor, in accordance with one or more implementations of the disclosure.
Figure 6:
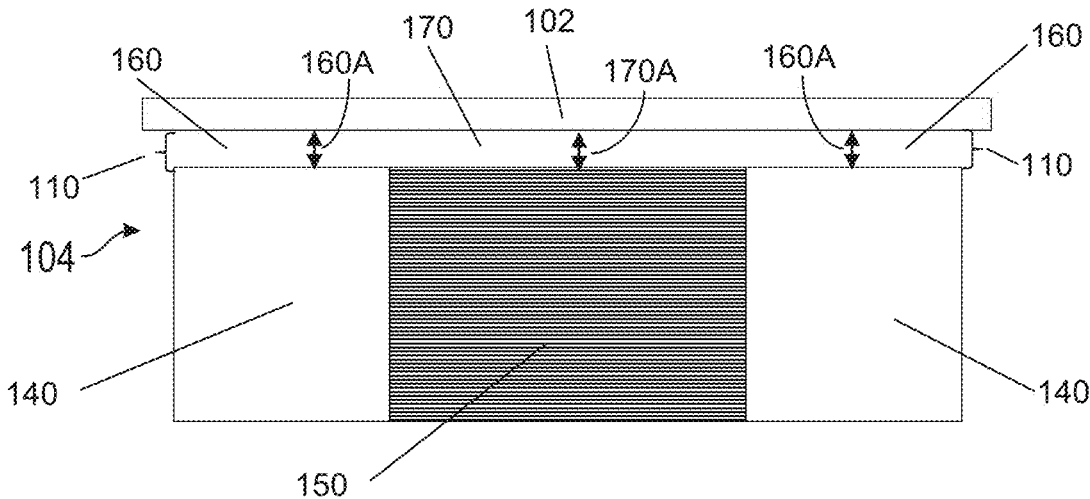

FIGS. 5-6 are schematic views of a cross-sectional view of a portion of a stator 102 and a hybrid rotor 104 of an exemplary synchronous electric machine 100 having an air gap 110 between the stator 102 and hybrid rotor, in accordance with one or more implementations of the disclosure. The air gap 110 separates the stator 102 from the hybrid rotor, with the air gap 110 having a radial distance that varies axially along a length of the hybrid rotor. The air gap 110 is defined by the stator 102 and the hybrid rotor. Alternatively stated, the air gap 110 has a thickness as defined as a distance between the inner periphery of the stator 102 and the outer portion of the hybrid rotor 104. The thickness of the air gap 110 may vary axially along a length of the hybrid rotor. For example, thickness 160A and 170A may be different as shown in FIG. 5.

As illustrated in FIG. 5, the air gap 110 may include a first portion 160 and second portion 170 with differing radial distances. The first portion 160 has a radial distance that is greater than the radial distance of the second portion 170. In other words, the first portion 160 has an air gap 110 that is smaller than the air gap 110 of the second portion 170. The air gap 110 of the first portion 160 is about 0.1% to about 10% smaller than the air gap 110 of the second portion 170. For example, the air gap 110 of the first portion 160 may be about 0.1%, 0.2%, 0.3%, 0.4%, 0.5%, 0.6%, 0.7%, 0.8%, 0.9%, or 10% smaller than the air gap 110 of the second portion 170.

The first portion 160 coincides with the non-permanent magnet subset 140 and the second portion 170 coincides with the permanent magnet subset 150. As illustrated in FIG. 5, the hybrid rotor 104 has two first portions 160 and one second portion 170, where the second portion 170 is disposed axially between the two first portions 160.

In another embodiment, the air gap 110 includes a plurality of portions with differing radial distances. For example, a first portion 160 may coincide with a non-permanent magnet subset 140 with a radial distance of $R_1$ (i.e., 250 millimeters), a second portion 170 may coincide with a permanent magnet subset 150 with a radial distance of $R_2$ (i.e., 225 millimeters), and a third portion may coincide with a non-permanent magnet subset 140 with a radial distance $R_3$ (i.e., 238 millimeters), where $R_1$ is greater than $R_2$ and $R_3$, and $R_3$ is greater than $R_2$.

In another embodiment, the air gap 110 may be uniform with the first portion 160 and second portion 170 having the same radial distances. As illustrated in FIG. 6, the hybrid rotor 104 has two first portions 160 and one second portion 170, where the second portion 170 is disposed axially between the two first portions 160. The first portion 160 coincides with the non-permanent magnet subset 140 and the second portion 170 coincides with the permanent magnet subset 150. Alternatively stated, the thickness of the air gap 110 may be uniform axially along a length of the hybrid rotor. For example, thickness 160A and 170A of the air gap 110 may be the same as shown in FIG. 6.

Figures 7, 8, 9:
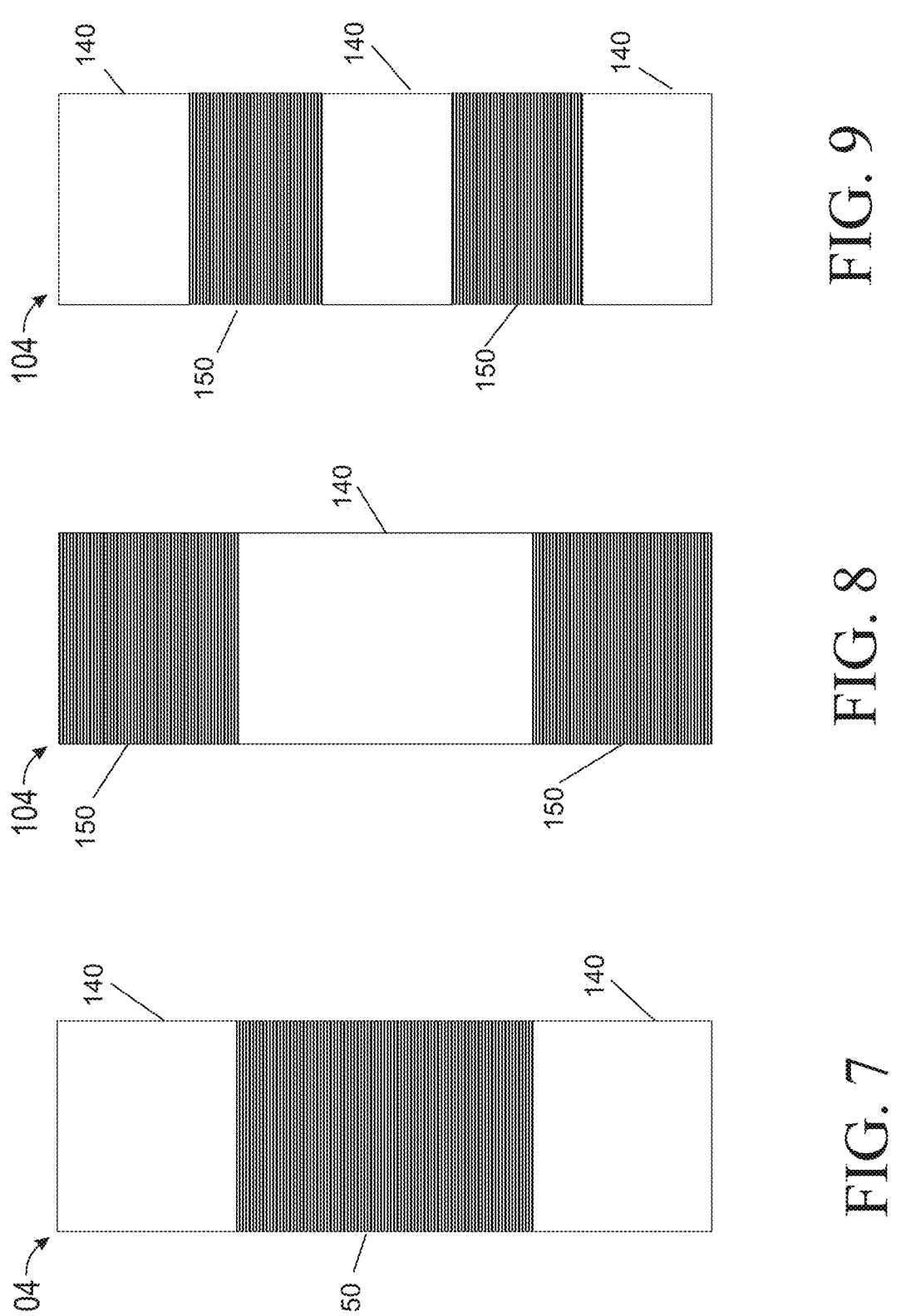
FIGS. 7-9 are schematic views of a hybrid rotor 104 with various configurations involving non-permanent magnet subsets 140 and permanent magnet subsets 150, in accordance with one or more implementations of the disclosure.

FIGS. 7-9 are schematic views of a hybrid rotor 104 with various configurations involving non-permanent magnet subsets 140 and permanent magnet subsets 150, in accordance with one or more implementations of the disclosure. The non-permanent magnet subsets 140 include a plurality of laminations devoid of magnetic material, such a permanent magnet. The permanent magnet subsets 150 include a plurality of laminations having one or more permanent magnets.

FIG. 7 illustrates a configuration with a permanent magnet subset 150 disposed between two non-permanent magnet subsets 140. This configuration focuses on optimizing the torque and performance of the electric machine 100 by positioning the permanent magnet subset 150 at the axial core of the hybrid rotor.

As illustrated in FIG. 7, the hybrid rotor 104 includes two distal ends axially opposite of each other, with each distal end having one of the two non-permanent magnet subsets 140. The permanent magnet subset 150 is disposed between two non-permanent magnet subsets 140. By positioning the permanent magnet subset 150 at the axial core instead of the distal ends of the hybrid rotor, magnetic leakage is reduced; thus, increasing the permanent magnets 154 interaction with the RMF of the stator.

In addition, by being located at the distal ends of the hybrid rotor, the non-permanent magnet subsets 140 may function as end plates for the hybrid rotor 104 by containing or restricting the permanent magnet subsets 150; thus, reducing the need for end plates.

FIG. 8 illustrates a configuration with a non-permanent magnet subset 140 disposed between two permanent magnet subsets 150. In this configuration, the non-permanent magnet subset 140 prevents or limits the demagnetization of the permanent magnets 154 within the hybrid rotor 104 and helps optimize magnet thermal performance of the hybrid rotor.

During the operation of the electric machine 100, the thermal energy (i.e., heat) concentrates at the center or core of the electric machine 100. The thermal energy is generated from the electrical loading and high frequency operation of the electric machine 100. If a permanent magnet is located at or near the core of the electric machine 100, the thermal energy may increase the temperature of the permanent magnet, reducing the strength of the magnetic field emanating from the permanent magnet. If the temperature of a permanent magnet exceeds the Curie temperature of the permanent magnet, the permanent magnet may experience demagnetization. The Curie temperature is the temperature at which a ferromagnetic material (i.e., a permanent magnet) loses its permanent magnetic properties.

By positioning the non-permanent magnet subset 140 at the core of the hybrid rotor, which is the core of the electric machine 100, the non-permanent magnet subset 140 experiences the increase in temperature instead of the permanent magnet subset 150. By directing the thermal energy away from the permanent magnet subset 150, the thermal performance of the hybrid rotor 104 is optimized since the effects of temperature on the permanent magnets 154 are limited by prohibiting the permanent magnet to reach the Curie temperature.

FIG. 9 illustrates a configuration with the hybrid rotor 104 having non-permanent magnet subsets 140 at the distal ends of the hybrid rotor, with two permanent magnet subsets 150 disposed between the distal ends, and a non-permanent magnet subset 140 disposed between the two permanent magnet subsets 150. This configuration focuses on optimizing the torque and performance of the electric machine 100 while optimizing the thermal performance of the hybrid rotor.

As illustrated in FIG. 9, the non-permanent magnet subset 140 is positioned at the core of the hybrid rotor 104 and is disposed between the permanent magnet subsets 150 since the core of the hybrid rotor 104 experiences the highest temperature during operation of the electric machine 100. The non-permanent magnet subset 140 absorbs the thermal energy and improves thermal performance of the hybrid rotor. The two permanent magnet subsets 150 optimize the torque and power of the electric machine 100 since the magnetic torque generated from the permanent magnets 154 provides a higher torque output than reluctance torque.

The non-permanent magnet subsets 140, in combination with the permanent magnet subsets 150, reduce the torque ripple experienced by the electric machine 100. The combination of the non-permanent magnet subsets 140 and permanent magnet subsets 150 reduces the use of rare-earth and heavy rare-earth materials while maintaining the performance of the electric machine 100.

Although FIGS. 7-9 provide three exemplary configurations, the present disclosure is not limited to the three configurations. For example, another configuration of the hybrid rotor 104 may include the hybrid rotor 104 having permanent magnet subsets 150 at the distal ends of the hybrid rotor, with two non-permanent magnet subsets 140 disposed between the distal ends, and a permanent magnet subset 150 disposed between the two non-permanent magnet subsets 140.

Unless specifically stated from context, as used herein, the term "about" is understood as within a range of normal tolerance in the art, for example within 2 standard deviations of the mean. "About" can be understood as within 10%, 5%, 1%, 0.5%, 0.1%, 0.05%, or 0.01% of the stated value. "About" can alternatively be understood as implying the exact value stated. Unless otherwise clear from the context, the numerical values provided herein are modified by the term "about."

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. "A", "an", "the", "at least one", and "one or more" are used interchangeably to indicate that at least one of the items is present. A plurality of such items may be present unless the context clearly indicates otherwise. All values of parameters (e.g., of quantities or conditions), unless otherwise indicated expressly or clearly in view of the context, including the appended claims, are to be understood as being modified in all instances by the term "about" whether or not "about" actually appears before the value. A component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A synchronous electric machine, comprising:
a stator configured for carrying alternating currents for generating a rotating magnetic field (RMF);
a hybrid rotor configured for rotating within the stator according to a torque induced by the RMF, the hybrid rotor having a plurality of laminations stacked together axially, wherein an air gap separates the hybrid rotor from the stator and varies axially along a length of the hybrid rotor, and
wherein a non-permanent magnet subset of the laminations includes one or more through-holes configured for limiting torque ripple; and
wherein a permanent magnet subset of the laminations includes one or more pockets, with the pockets each removably holding one or more permanent magnets, the permanent magnets operable for interacting magnetically with the RMF, and wherein the air gap includes a first portion and a third portion that are different in size and coincide with the non-magnetic subset, and a second portion that coincides with the permanent magnet subset.

2. The synchronous electric machine according to claim 1, wherein the hybrid rotor includes a first non-permanent magnet lamination of the non-permanent magnet subset at a first distal end and a second non-permanent magnet lamination of the non-permanent magnet subset at a second distal end axially opposite of the first distal end.

3. The synchronous electric machine according to claim 2, wherein each lamination of the permanent magnet subset is disposed between the first distal end and the second distal end.

4. The synchronous electric machine according to claim 3, wherein a first permanent magnet lamination of the permanent magnet subset adjoins the first non-permanent magnet lamination, a second permanent magnet lamination of the permanent magnet subset adjoins the second non-permanent magnet, and a third non-permanent magnet lamination of the non-permanent magnet subset is disposed between the first and second permanent magnet laminations.

5. The synchronous electric machine according to claim 1, wherein the hybrid rotor includes a first permanent magnet lamination of the permanent magnet subset at a first distal end and a second permanent magnet lamination of the permanent magnet subset at a second distal end axially opposite of the first distal end.

6. The synchronous electric machine according to claim 5, wherein each lamination of the non-permanent magnet subset is disposed between the first distal end and the second distal end.

7. The synchronous electric machine according to claim 1, wherein a first thickness of the first portion of the air gap is greater than a second thickness of the second portion of the air gap.

8. The synchronous electric machine according to claim 7, wherein the first thickness of the first portion of the air gap is greater than a third thickness of the third portion of the air gap, and wherein the second thickness is less than the third thickness.

9. The synchronous electric machine according to claim 1, wherein the second portion is disposed axially between a pair of first portions.

10. The synchronous electric machine according to claim 1, wherein the permanent magnets are removably held in each of the pockets.

11. The synchronous electric machine according to claim 1, wherein the permanent magnets include a magnetic material having a self-generating persistent magnetic field, and wherein the non-permanent magnet subset is devoid of the magnetic material.

12. The synchronous electric machine according to claim 1, wherein the non-permanent magnet subset includes steel, soft magnetic composites, or a combination thereof.

13. The synchronous electric machine according to claim 12, wherein the non-permanent magnet subset is positioned centrally along an axial length of the hybrid rotor to limit demagnetization on the permanent magnets in the hybrid rotor.

14. The synchronous electric machine according to claim 1, wherein the one or more permanent magnets are affixed to an exterior surface of the permanent magnet subset.

15. A synchronous electric machine, comprising:

a stator configured for carrying alternating currents for generating a rotating magnetic field (RMF); and a hybrid rotor configured for rotating relative to the stator, the hybrid rotor including a plurality of laminations, wherein an air gap separates the hybrid rotor from the stator and varies axially along a length of the hybrid rotor, and wherein:

a permanent magnet subset of the laminations includes one or more pockets holding a permanent magnet, each permanent magnet subset including a permanent magnetic material having a self-generating persistent magnetic field; and a non-permanent magnet subset of the laminations is devoid of the permanent magnetic material, wherein the air gap includes a first portion, a second portion, and a third portion that are different in size, the first portion and the second portion coinciding with the non-magnetic subset, and the second portion coinciding with the permanent magnet subset, and wherein:

a first thickness of the first portion of the air gap is greater than a second thickness of the second portion of the air gap and a third thickness of the third portion of the air gap; and the third thickness of the third portion of the air gap is greater than the second portion of the air gap.

16. The synchronous electric machine according to claim 15, wherein the permanent magnet is operable for interacting magnetically with the RMF to generate a magnetic torque in the hybrid rotor.

17. The synchronous electric machine according to claim 15, wherein the non-permanent magnet subset includes a non-permanent magnetic material, wherein the non-permanent magnetic material includes one or more through-holes operable to create a flux barrier to the RMF.

18. The synchronous electric machine according to claim 17, wherein the non-permanent magnetic material includes steel, soft magnetic composites, or a combination thereof.

19. A motor vehicle comprising:

a vehicle body;

multiple drive wheels mounted to the vehicle body; and a synchronous electric machine mounted to the vehicle body and operable to drive one or more of the drive wheels to thereby propel the motor vehicle, the synchronous electric machine including:

a stator configured for carrying alternating currents for generating a rotating magnetic field (RMF);

a hybrid rotor configured for rotating within the stator according to a torque induced by the RMF, the hybrid rotor having a plurality of laminations stacked together axially, wherein an air gap separates the hybrid rotor from the stator and varies axially along a length of the hybrid rotor;

wherein a non-permanent magnet subset of the laminations includes no magnets and one or more through-holes configured for limiting torque ripple; and wherein a magnet subset of the laminations includes one or more pockets, with the pockets each removably holding one or more magnets, the magnets operable for interacting magnetically with the RMF, and wherein the air gap includes a first portion and a third portion that are different in size and coincide with the non-magnetic subset, and a second portion that coincides with the permanent magnet subset.

20. The motor vehicle of claim 19, wherein the non-permanent magnet subset includes a non-permanent magnetic material operable to create a flux barrier to the RMF.

* * * * *